(No Model.)
D. FULLER.
CREAMING CAN.
No. 321,354. Patented June 30, 1885.
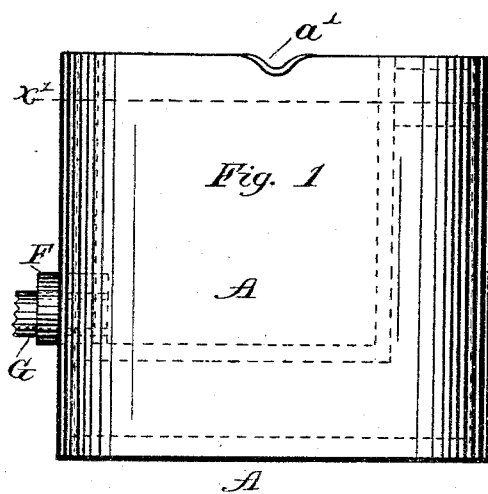
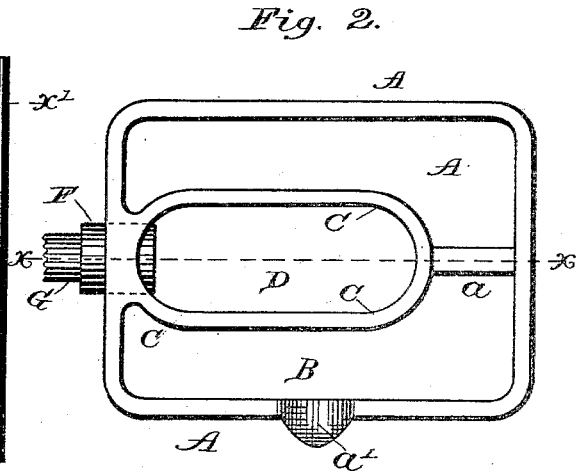
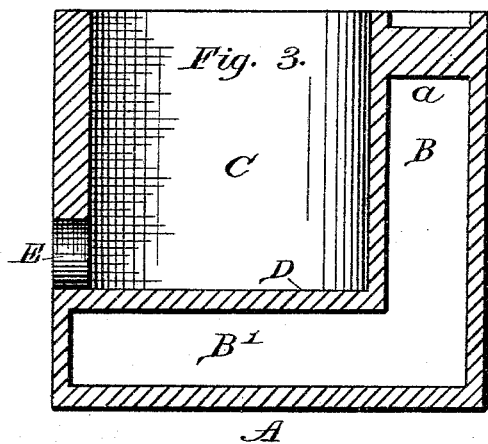
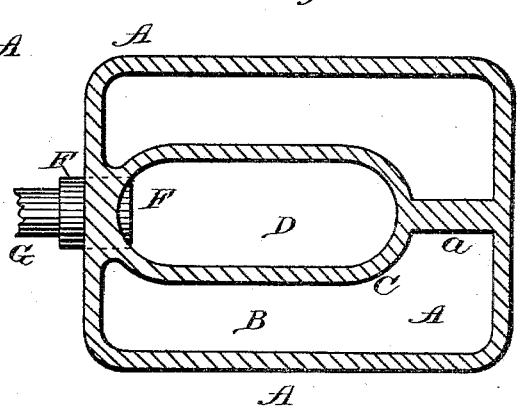
Witnesses
John C. Miller
L. Melchior
Daniel Fuller,
Inventor
Attorney.

UNITED STATES PATENT OFFICE.

DANIEL FULLER, OF OAKWOOD, MICHIGAN.

CREAMING-CAN.

SPECIFICATION forming part of Letters Patent No. 321,354, dated June 30, 1885.

Application filed July 24, 1884. (No model.)

*To all whom it may concern:*

Be it known that I, DANIEL FULLER, a citizen of the United States, residing at Oakwood, in the county of Oakland and State of Michigan, have invented certain new and useful Improvements in Creaming-Cans; and I do hereby declare the following to be a full, clear, and exact description of the invention, such as will enable others skilled in the art to which it appertains to make and use the same.

The object of this improvement is a creamery or dairy vessel for more expeditiously cooling milk and more conveniently separating the cream from the same. These results are attained by the device illustrated in the drawings herewith filed as part hereof, in which the same letters of reference denote the same parts in the different views.

Figure 1 is a side elevation of a creamery-vessel embodying the features of my improvement. Fig. 2 is a top view of the same. Fig. 3 is a longitudinal vertical section thereof. Fig. 4 is a transverse section taken on the line X′ X′ of Fig. 1.

The vessel A has a milk-receptacle, C, which is located relatively to the vessel, as most clearly seen in Figs. 2 and 4, the size of the milk-receptacle being of such dimensions as to provide for a space, B B′, for receiving water or other cooling agent, the said space partially surrounding the said receptacle C. An opening, E, is formed in the vessel A at a point above the elevated bottom D of the receptacle C.

*a* refers to a brace which connects the receptacle C with the vessel A. The said vessel is provided upon one of its upper sides with a discharge-lip, *a*′, and has inserted in its opening *e* a cork, F, for the reception of the faucet tube or pipe G.

By opening the faucet-pipe G the milk will flow out, after which the cork F is taken out and the cream can be readily removed from the large opening thus made.

It will be obvious that the improved vessel herein described may be readily produced from clay by the ordinary hand operation, and then subjected to burning in the manner incident to the production of other pottery articles.

Having explained the construction and operation of my improvement, what I claim as new, and desire to secure by Letters Patent, is—

The herein-described dairy-vessel having a milk-receptacle, C, partially surrounding the same, a chamber, B B′, said vessel being provided with a brace, *a*, connecting its milk-receptacle and outer wall, and with a discharge-lip, *a*′, and discharge-tube F, communicating with said receptacle C, substantially as set forth.

In testimony whereof I affix my signature in presence of two witnesses.

DANIEL FULLER.

Witnesses:
ALBERT H. PURSE,
SILAS T. FENN.